United States Patent [19]

Bird

[11] 4,341,282
[45] Jul. 27, 1982

[54] CARRIER VEHICLE FOR SEISMIC VIBRATIONAL SYSTEM

[75] Inventor: James M. Bird, Tulsa, Okla.

[73] Assignee: Industrial Vehicles International Inc., Tulsa, Okla.

[21] Appl. No.: 151,256

[22] Filed: May 19, 1980

[51] Int. Cl.³ ............................................. G01V 1/04
[52] U.S. Cl. .............................. 181/114; 180/53 R; 180/70 R; 192/18 A; 192/113 B; 192/18 R; 367/189
[58] Field of Search ........... 181/114; 180/53 R, 53 C, 180/53 D, 70 R; 192/18 A, 113 B, 18 R

[56] References Cited

U.S. PATENT DOCUMENTS

| | | | |
|---|---|---|---|
| 2,205,989 | 6/1940 | Meyers et al. | 192/18 A |
| 3,088,552 | 5/1963 | Christenson et al. | 192/18 A X |
| 3,157,257 | 11/1964 | Root | 192/18 A |
| 3,789,951 | 2/1974 | Silverman | 181/114 |
| 3,811,530 | 5/1974 | Johnston | 181/114 |
| 3,905,446 | 9/1975 | Ross | 181/114 |
| 4,207,969 | 6/1980 | Howell | 192/113 B X |
| 4,269,289 | 5/1981 | Winkler | 192/113 B X |

*Primary Examiner*—Joseph Paul Brust
*Attorney, Agent, or Firm*—Daniel Silverman

[57] ABSTRACT

An over-the-road type vehicle for transport and powering of a seismic hydraulic vibrator which is adapted to operate in either one of two modes of operation. A first mode is the conventional mode wherein the vehicle is operated over large distances at varying road speeds, obtained by use of multiple gear ratios, and varying engine speeds. The second mode of operation is in a single value of road speed, with engine under control of a governor, to operate at constant high speed, and the movement of the vehicle is by successive short traverses at constant speed. In this second mode of operation the single engine alternately powers the hydraulic vibrator, and with the engine still at high speed, then moves the vehicle to a new vibration point a short distance away. A high energy efficiency is provided by the use of a mechanical, rather than hydraulic drive system, and a high time efficiency is provided by a novel style of clutch that can start the vehicle from rest with the engine at maximum speed.

11 Claims, 6 Drawing Figures

4,341,282

CARRIER VEHICLE FOR SEISMIC VIBRATIONAL SYSTEM

BACKGROUND OF THE INVENTION

1. Field of the Invention

This invention lies in the field of over-the-road vehicles for carrying and powering an hydraulic seismic vibrator, while operating at high energy efficiency and high time efficiency.

2. Description of the Prior Art

In the use of seismic vibrators as seismic sources, the vibrator, while operating rests on a baseplate or pad on the earth, with part of the weight of the truck or vehicle pressing down on the baseplate.

In off-the-road vehicles it has become customary to use articulated vehicles with independent hydraulic drive on each of the 4 wheels. The vibrator is positioned in the middle of the vehicle. However, while the hyraulic drive gave excellent control of the vehicle and fast starts, the energy efficiency of the hydraulic drive system is low, of the order of 75% or less. This would mean that to get 300 horsepower, an engine of 400 HP. would be required, and means would be required to remove 100 HP. of heat from the hydraulic fluid.

While the hydraulic drive of the off-the-road carriers could be used in an over-the-road vehicle, the poor energy efficiency and cost of such a system makes it impractical.

The improved mechanical system of this invention provides better energy efficiency than the hydraulic system, and provides equally high time efficiency in fast starts with engine at full speed.

SUMMARY OF THE INVENTION

It is a primary object of this invention to provide a design of an over-the-road carrier to transport and power a high frequency hydraulic seismic vibrator, in a system which has high energy efficiency.

It is a further object of this invention to provide a carrier that has very high acceleration and deceleration, so that short distance, stop-and-go operation demanded by the seismic process can be provided with high time efficiency.

These and other objects are realized and the limitations of the prior art are overcome in this invention by constructing the carrier vehicle with the following system components:

1. A more or less conventional construction of cab, frame, front wheels and rear tandem wheels,
2. A single engine large enough to alternately power the vibrator and the vehicle.
3. A vibrator close-coupled to the baseplate or pad, mounted in the center of the vehicle.
4. A gear drive transmission with input connected to the engine, and output connected to the tandem rear wheels.
5. A fast acting clutch of a type that can be closed with the vehicle at rest, and the engine running at maximum operating speed.

BRIEF DESCRIPTION OF THE DRAWINGS

These and other objects and advantages of this invention and a better understanding of the principles and details of the invention will be evident from the following description, taken in conjunction with the appended drawings, in which.

DESCRIPTION OF THE PREFERRED EMBODIMENT

Figure 1:
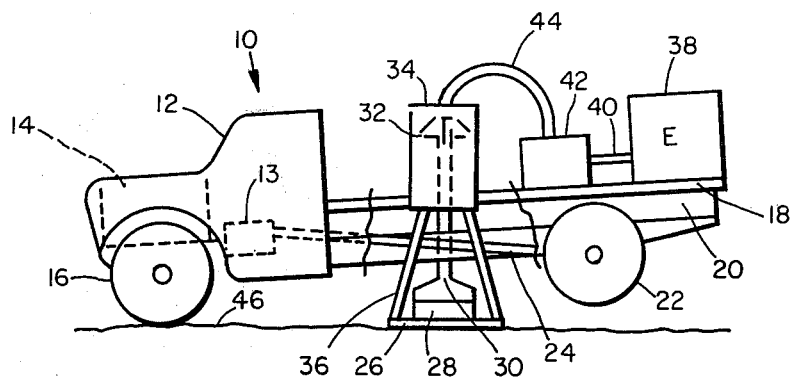
FIG. 1 is a schematic drawing of the prior art construction of an over-the-road seismic vibrator carrier.

Before describing the illustrated apparatus in the drawings it is desirable to discuss further some of the requirement set on the nature of and the operation of the carrier system by the type of services provided by the equipment.

The work cycle of a seismic vibrator crew involves a group of three-to-five or more vibrators mounted on a carrier similar to the one of this invention. The assumption will be made, for convenience, that three carriers are used. The three vibrator carriers, or trucks, or vehicles, are spaced a selected distance, one behind the other, about 20-30 feet apart. They stop at selected points on a line of vibration points, or VP's, lower the vibrator and baseplate, or pad, to the ground, and lift a portion of the weight of the truck to press the pad to the earth.

The vibrator then runs through a sweep, or a time-pattern of frequencies, which may last from 7 seconds to 28 seconds. All 3 or more vibrators operate precisely in unison during this vibrating cycle, with minimum phase difference. At the end of the vibrating cycle the truck is lowered to the ground and the vibrator and pad are raised. The trucks then move, as rapidly as possible, to the next VP, which may be 20 to 30 feet away. They all should move in unison, the same distance, to keep the same position pattern for various reasons, important to the quality of the seismic data recorded.

In this work program, the vibrators are only "working" while they are vibrating. Obviously, that part of this program, (about 6 seconds), while the vibrator is being lifted or lowered, and the carriers are moving to a new VP, is "dead time" and is non-productive, in the seismic sense.

Whether the vibratory cycle lasts for 13 seconds or 28 seconds, it is economically important to move from vibration point to vibration point quickly. Each second involved in this maneuver means dollars and cents. To illustrate this, it is customary for the vibrator to vibrate between 900 to 1200 times a day. An increase of one second in each of the 1200 "move-ups" a day would result in a loss of approximately 20 minutes productive work. Because a geophysical crew can cost as much as $2,000.00 an hour to operate, twenty minutes represents a substantial amount of money to the geophysical contractor.

The pump that operates the vibrator unit is a variable displacement pump of the pressure compensated type. When the sweep signal of the vibrator control unit appears at the servo valve of the vibrator, it is imperative that the maximum operating pressure of the system be present at that moment. The servo valve can present a very steep-fronted demand curve to the hydraulic supply of the vibrator unit. To accommodate this almost square-wave type of demand curve, it is important that the engine be operating at its normal (high) operating speed when the unit is ready to vibrate. This requirement that the engine be operating at a constant high speed complicates the problem of using that engine for moving the vehicle from point-to-point.

Conventional gear boxes and automatic transmissions normally require that the engine be idled before engagement of the transmission. Slowing a 200–400 horsepower engine from its normal operating speed of approximately 1800 rpm to the 600 rpm necessary, takes too much time. The 600 rpm is necessary before engaging the conventional transmission. Further time also is needed to speed up the engine again after the vehicle has been brought to a stop in preparation for vibrating. The necessary specifications then for a drive system for a vibrator, where one engine is to be used for both the vibrating mode and the vehicle traction mode, is that the vehicle must operate in traction while the engine is running in its governed optimum speed of 1800 to 2000 rpm. While I speak of "normal", or "high" as the operating speed of the engine, this will be the governed, most efficient, operating speed of 1800-2000 rpm.

There is an obvious financial advantage in using only one engine, versus the two, which have previously been used with seismic over-the-road carriers. But, of course, because of the conventional drive shaft, this plan cannot be used with present-day high frequency vibrators.

As previously mentioned, off-the-road vehicles have been built with a single engine driving two hydraulic pumps. One pump is dedicated to the vibrator unit, and the second pump is dedicated to the traction circuit of the vehicle. The traction circuit consists of a variable displacement pump driving a variable displacement type hydraulic motor, which in turn drives the vehicle through a gear transmission. The transmission is mounted to the rear of the vehicle and its output shaft drives forward to the rear of the tandem axle. This arrangement, though not conventional, was utilized for this particular truck design because of the fact that this truck mounted a new high frequency vibrator. This arrangement accomplishes the goal of allowing the single engine to be operated at one constant high speed and to power both the vehicle and the vibrator.

The hydrostatic drive solves the constant-engine-speed problem. There are, however, some disadvantages to this system. The first disadvantage is that the hydraulic pump and the hydraulic motor capable of moving a vehicle of 35,000 pounds are expensive units. Their combined cost is approximately the cost of an additional engine. A hydrostatic drive of this type has one other severe drawback. The over-all efficiency of the hydraulic pump is nominally of the order of 85 percent. The over-all efficiency of the hydraulic motor is approximately the same. When these two efficiencies are multipled together, one ends up with a transmission system that has an over-all efficiency of approximately 72 percent. This efficiency is quite low when compared to conventional mechanical transmissions. If one were to consider an engine of the 400 horsepower category to drive the vehicle, a loss over-all of 25 percent results in 100 horsepower being converted to heat. Furthermore, it is necessary to design into the system means for rejecting approximately 100 horsepower of heat, which further detracts from this system.

Although the hydraulic drive system is high in cost and low in efficiency, it does have the important advantage of being able to operate and drive the vehicle from rest with the engine at normal high operating speed. It was in an attempt to retain this advantage of the hydraulic system for fast acceleration, and keep the other advantages of the mechanical drive system, that this invention was made. What was needed was a clutch that would have the capability of handling the required torque of the vehicle, while having the heat rejection capability of doing this a thousand times a day. Conventional clutches of the normal design would not endure engagement while the engine was going at full speed, and repeating this at the frequency necessary to accommodate the seismic work.

Referring now to the drawings, and in particular to FIG. 1, there is shown a prior art, conventional low-frequency seismic vibrator mounted on an over-the-road vehicle, indicated generally by the numeral 10. It comprises a conventional truck with single or tandem rear wheels 22, cab 12, bed 18, and frame 20. There is a conventional engine 14 (shown in dashed outline) in the front of the truck, conventional transmission 13, and drive shaft 24 to the rear wheels.

The vibrator is indicated by numeral 34 and drive a baseplate, or pad, 26, which rests on the earth 46, through the medium of a tower structure of conventional design, shown schematically by 36. Since the vibrator weighs several thousand pounds, the optimum position of the vibrator 34 would, of course, be on top of the pad. However, because of the central drive shaft 24, the tower is required to support the vibrator several feet above the pad.

As is well described in the literature, and in the patent art, the vibrator is operated with the pad on the earth and the truck raised (to the position shown) by means of a hydraulic lifting mechanism 32 and 30, presses down on the pad through a compliance 28.

The vibrator is driven by means of a hydraulic pump 42 from a second engine 38 through shaft 40, all mounted on the rear deck 18. The hydraulic fluid is applied through hose 44 to the control valves of the vibrator in a conventional manner.

Figure 2:
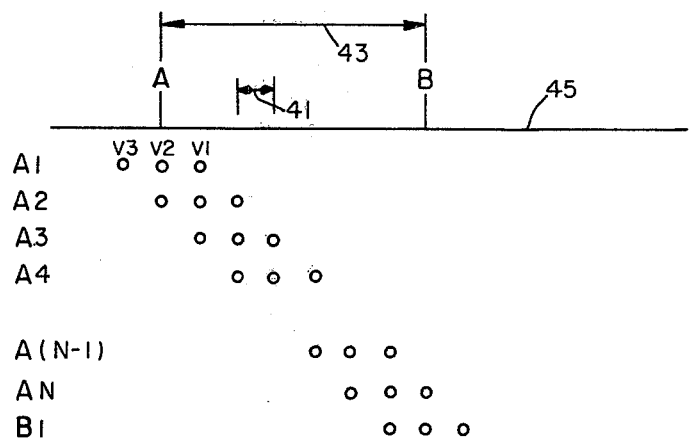
FIG. 2 is an illustration of the prior art normal procedure in carrying out seismic operations with multiple vibrators.

Referring briefly to FIG. 2 there is shown schematically a plan of operation of a seismic vibrator crew in the prior art. There is a line of profile 45, along which the geophones (not shown) are laid out, and along which the vibrators are run. Numeral 41 indicates the spacing between successive vibrators along the line. There may be 3 to 5 or more vibrators, numbered for convenience V1, V2, V3, etc. Numeral 43 indicates the spacing AB between successive geophone groups along the spread, or line of profile. The dimension 41 may be of the order of 20–25 feet, and 43 of the order of 200–250 feet, or more.

The successive positions A1, A2 ... A(N−1), AN, B1, etc. represent successive vibrating positions or VPs, for the vibrators along the profile line 45. The various positions A1, A2, A3, etc. are shown displaced, for clarity. Actually the vibrators are in line 45, and V2, V3 successively take the prior positions of V1, and so on. The position B1 starts the vibrations in relation to the next geophone group B–C and so on. Since the length of the carrier vehicles may be of the order of 20 feet, it can be seen that they move in precise synchronism in order not to interfere with each other, and to maintain the same relative positions.

This description of the operation of the vibrator forms no part of the invention, is conventional, and is provided simply to illustrate the service to which the carrier vehicles are put.

Figure 3:
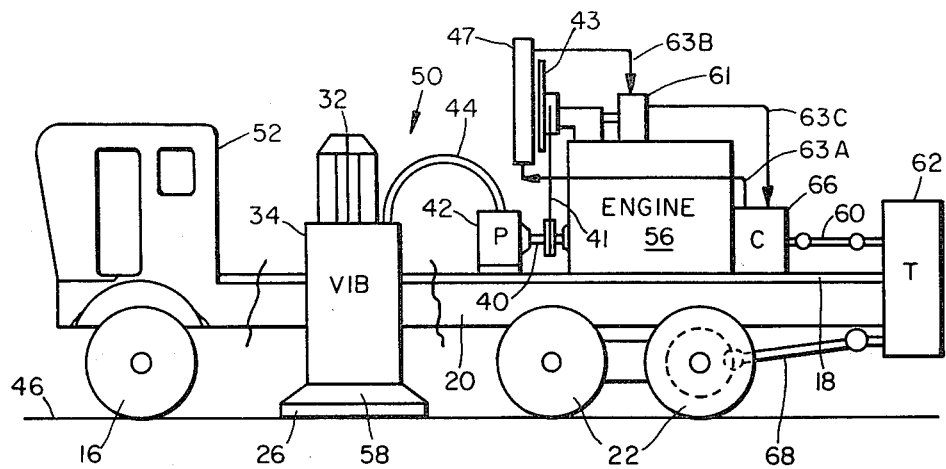
FIG. 3 is a schematic illustration of the carrier vehicle of this invention.

Referring now to FIG. 3, there is shown schematically one embodiment of the vibrator carrier of the invention. Like FIG. 1 it has the basic vehicle of frame 20, deck 18, front wheels 16, rear (dual) wheels 22, vibrator 34, baseplate or pad 26, mounting or coupling 58, etc. Unlike FIG. 1, FIG. 3 has only a single engine 56, on the rear deck. This engine is larger than 38 of FIG. 1 since it supplies power to both the vibrator system and the vehicle. And, of course, with the single engine in this position there is no conventional long drive shaft, such as 24, and the vibrator 34 can be placed in the middle of the vehicle, and low on the pad 26, with a simple rigid mechanical coupling 58. Of course, the hydraulic lift mechanism 32 (which is conventional) is provided to raise the vibrator and pad while moving; and then while vibrating, for raising the vehicle partially off the ground, to apply weight to hold the pad in contact with the earth.

The engine 56 supplies power through shaft 40 to the hydraulic pump 42 which supplies pressurized liquid to the vibrator 34 through hoses 44 in a conventional manner. Shaft 40 also drives a fan 43 through belts 41 to cool radiator 47. The main drive clutch 66 is direct-driven by the engine, and applies power to drive shaft 60. The oil which cools and lubricates the clutch is circulated by small pump 61, from the clutch 66 over line 63A, to the radiator 47, over line 63B to the pump 61, and over line 63C back to the clutch.

The engine 56 and clutch 66 supply power through drive shaft 60 to the gear transmission (commercial) 62. The gear transmission provides various drive speeds for conventional over-the-road operations. The output driveshaft 68 of the transmission 62 drives the rear wheels 22.

The vehicle shown in FIG. 3, which has just been described, is a novel type of vehicle for over-the-road service as a carrier for a seismic vibratory source.

It has a single engine which powers a hydraulic pump to serve the vibrator, and it has a mechanical transmission in combination with a novel mechanical clutch to power the vehicle.

This vehicle is adapted to be operated in either of two operating modes. The first mode is the customary long-distance travel mode in which various gear ratios of transmission are used and the engine is operated at varying speeds, from idling to maximum speed responsive to the accelerator. Shifting of gears is done while the engine is at low speed.

The second mode of operation is that of the normal vibrational seismic cycle, in which the vibrator is operated for a selected short period of time with engine at top speed, and full hydraulic power is available to the vibrator. After the vibrational part of the cycle is completed and the vibrator plus pad is lifted, preparatory to moving a selected short distance, and while the engine is still at top speed, the clutch 66 is thrown in, and the vehicle accelerates at the maximum rate, dependent on the torque output of the clutch. The vehicle then travels a selected distance, less than the desired move of 25-30 feet, the clutch is disengaged, and the brakes are applied to stop the vehicle at the desired point.

This service is different from any other over-the-road operation, and differs mainly in the second mode, where the engine is under control of a governor to operate continuously at maximum speed. The duty cycle that the clutch is called on to perform is extremely demanding, and no conventional clutch is available on the market that will do this.

Because of the mechanical clutch and drive used, the energy efficiency is much higher than that of the hydraulic drive. Also, since the engine is constantly running at maximum speed, maximum power is available for acceleration and traverse of the vehicle, so that the vehicle operates at maximum time efficiency. That is, it carries out the successive short moves demanded by the seismic program, in much less time than is possible with conventional vehicles, which must operate only in the first mode.

Figure 4:
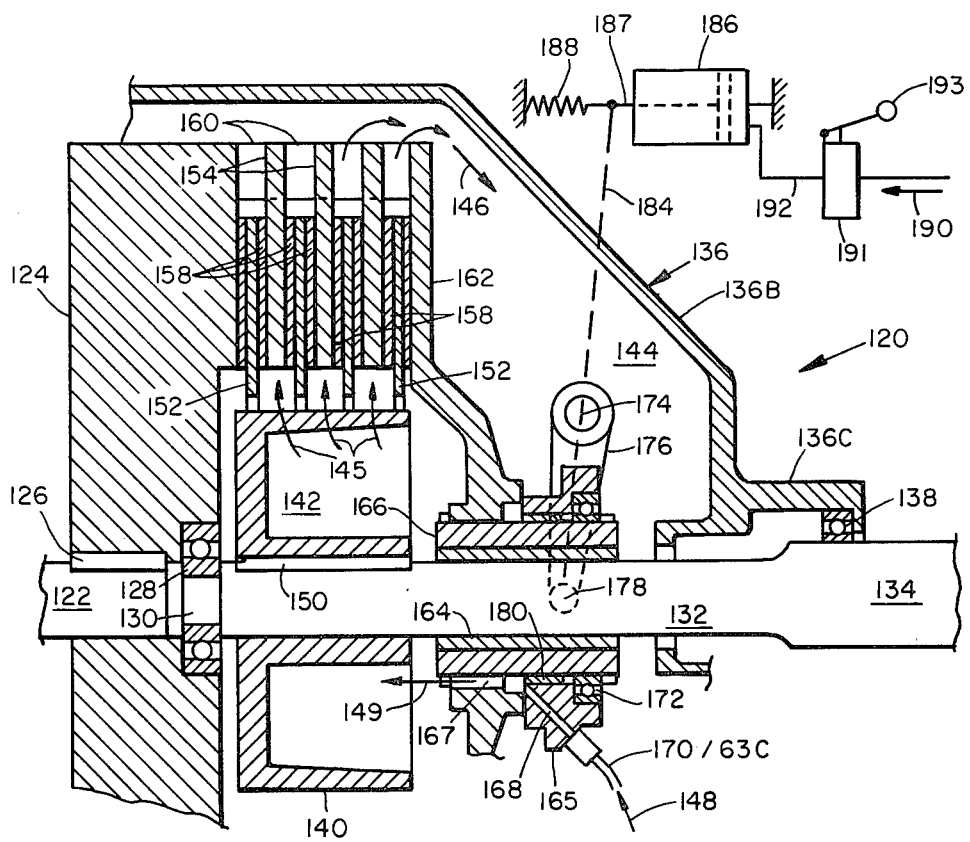
FIG. 4 is a schematic drawing of the construction of the wet disc clutch of this invention.

Referring now to FIG. 4, there is shown in partial cross-section a schematic view of one embodiment of the improved clutch of this invention. It is based upon the concept of the "wet disc clutch", which has been used in small sizes, in conventional gear transmissions.

The clutch indicated generally by the numeral 120, is attached to the output end of the engine, in a conventional manner. The engine shaft 122 carries a flywheel 124 which is locked, by spline, or by key 126, to the shaft 122.

A separate output clutch shaft 132 is co-linear with the engine shaft. One end 130 is supported by the flywheel 124 in bearing 128. The second end 134 of the clutch shaft is supported in bearing 138 in the clutch housing 136C, also indicated generally by the numeral 136. The drive shaft 60 of FIG. 3 would be attached to shaft 134.

A support structure 140 is keyed at 150 to shaft 132 and rotates with it. A plurality of annular steel discs 152 are supported by member 140 on its periphery, and are keyed to 140, to rotate with it.

A plurality of annular friction discs 154, both sides covered with a conventional friction material 158 such as used on automobile brakes. The friction discs are keyed by means 160 to rotate with the engine shaft.

A pressure plate 162 is keyed to a sleeve 166 which rotates about shaft 132 on bearing 164. The sleeve 166 is adapted to slide along shaft 132, so that pressure plate 162 can press on the annular discs 152 and 154, squeezing them closely together, between the flywheel and the pressure plate.

The friction material 158 on each of the friction plates 154 have a plurality of shallow radial grooves (not shown) in their outer surfaces for the passage of pressurized oil outwardly from the inside of the stack of discs, to lubricate and cool the discs.

A ring member 165 surrounds the sleeve 166 and rotates on bearing 172, but is locked longitudinally to the sleeve 166. A yoke 176 is locked to horizontal shaft 174 which is supported in bearings on the housing 136. The yoke arms have two pins which fit into diametral openings 178 in the sides of ring 165. Thus by rotating the transverse shaft 174, the yoke moves the ring 165 longitudinally, and with it, the pressure plate 162.

Outside of the housing an arm shown schematically by the dashed line 184 is attached at one end to shaft 174, and at the other end to piston rod 187, which is attached to a pneumatic actuator 186. Compressed air is supplied in accordance with arrow 190 to a manual valve 191 operated by handle 193 and to line 192 to the actuator 186. A compressional spring 188 provides a torque to cause the sleeve 166, with ring 168 and pressure plate 162 to move to the left in FIG. 4, applying pressure on the stack of interleaved discs 152,154, which pressure is released by the air cylinder.

The surfaces of the steel discs 152 and the friction discs 154 are highly polished to eliminate any roughness, so that whatever frictional torque is developed is dependent only on the pressure with which the discs are pressed against each other.

With the engine running at full speed, controlled by a governor, and the vehicle at rest, shaft 132 is stationary. When compressed air is released from the air cylinder 186 through valve 191, the piston will move to the right forced by spring 188, and will take with it arm 184. This will move the pressure plate 162 against the discs, and create a frictional torque between the engine shaft 122 and the clutch shaft 132. At the start there is complete slippage of the discs until, with spring pressure, and thus frictional torque, the vehicle begins to accelerate. Very soon the shaft 132 will be turning in synchronism with engine shaft 122, and there will be no slippage of the discs.

Normally for short distance movement such as the 20-25 feet required in the seismic process, the transmission will be set to low gear. Thus, the starting torque required is minimum, and the vehicle will remain in low gear. When the vehicle reaches a selected distance the valve 191 will be opened and the piston allowed to move to the left against the force of spring 188, and the pressure plate will be moved to the right, releasing the pressure on the discs, until there is no frictional torque. The brakes can then be set to bring the vehicle to a stop.

Because of the large amount of heat developed between the discs during the acceleration time, where there is slippage of the clutch, oil under pressure must be forced through hose 170/63C of FIG. 4, in accordance with arrow 148 through openings 168 and 167 into space 142, then in accordance with arrows 149,145 outwardly through the grooves in the resistance discs 154, then in accordance with arrows 146 into space 144. The oil, driven by pump 61 (FIG. 3) then takes the hot oil from housing 136 through line 63A to the radiator 47, which cools the oil, which then flows through line 63B to the pump 61, and by line 63C back to the clutch, and so on.

With high pressure oil and sufficient cooling facility, the clutch plates can be protected, in spite of the severe service, resulting from the application of power to the clutch from the engine at high speed. With sufficient area of discs and sufficient air pressure, a very high friction torque can be provided. This will provide rapid acceleration of the vehicle and minimize the length of time that slippage occurs. Thus, this clutch can provide the ability of the vehicle to operate in the second mode, previously described, with consequent high time-efficiency and high energy-efficiency.

Figure 5:
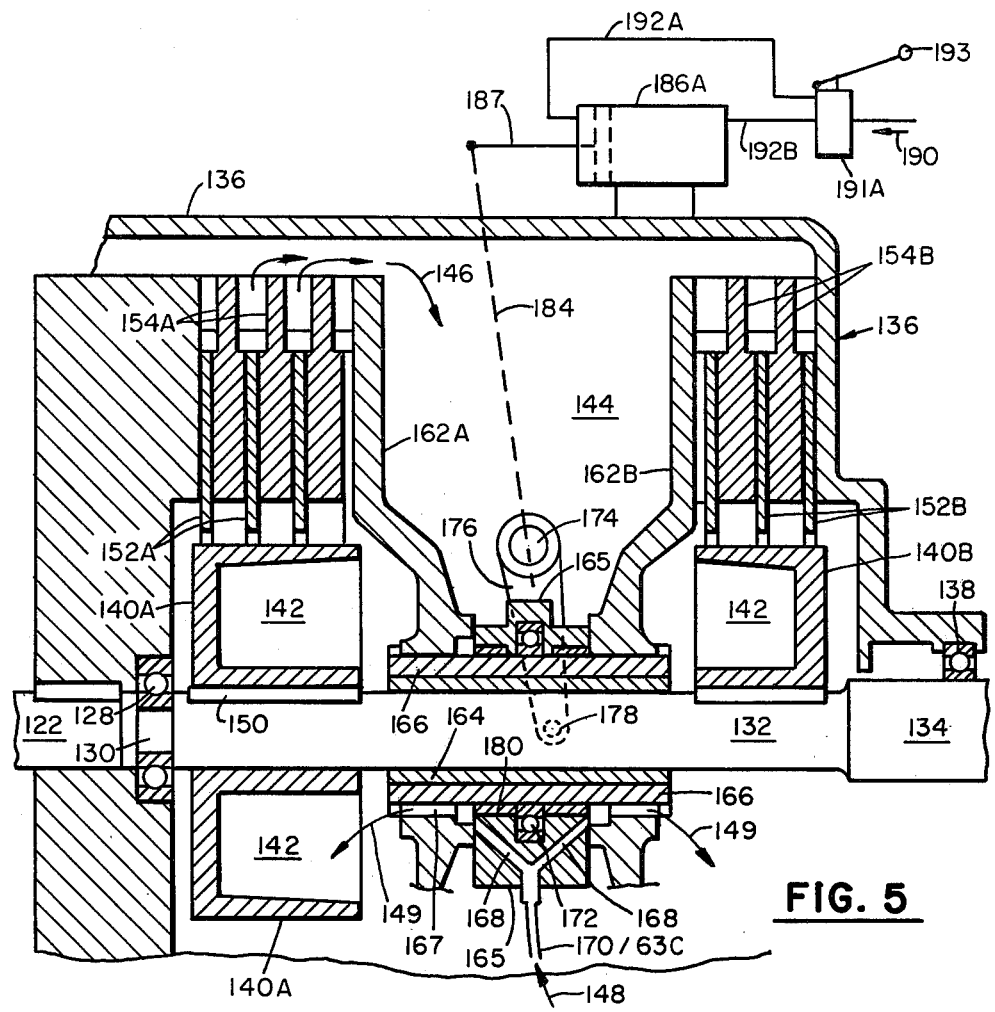
FIG. 5 is a schematic drawing of a second embodiment of the clutch of FIG. 4.

It will be clear, of course, that if this clutch can provide the required torque, with slippage at the start, to accelerate the vehicle from rest, at full engine speed, then it also can do the reverse. That is, it can decelerate the vehicle to rest. In FIG. 5 is shown a second embodiment of the clutch of FIG. 4, which includes two sets of friction discs, one set 152A, 154A, positioned between the engine shaft and the clutch shaft, similar to that of FIG. 4, and a second set 152B, 154B, between the clutch shaft (which is turning in synchronism with the wheels) and the clutch housing, or frame of the vehicle.

Where possible, the parts of FIG. 5 bear the same descriptive numerals as FIG. 4, so the same description given for FIG. 4 will apply to FIG. 5. FIG. 5 differs in that it has two sets of discs 152A, 154A, and 152B, 154B, and two pressure plates 162A, 162B. Pressure plate 162A presses discs 152A, 154A against the flywheel 124, while pressure plate 162B presses plates 152B, 154B against the housing 136. Pressure plate 162A controls the acceleration of the vehicle, while plate 162B controls the deceleration. Both plates are controlled by a single ring 165, yoke 176, arm 184, piston rod 187, and double-acting air cylinder 186A. This is controlled by valve 191 applying air alternately to lines 192A and 192B.

While I have described my invention in terms of a vehicle, as shown in FIG. 3, that has a single engine mounted on the rear deck, part of the reason for this was:
(a) the need to mount the conventional high frequency vibrator directly on top of the pad, on the ground, and
(b) This could not be done with the conventional truck, because, with the engine in front, there is a long driveshaft between the engine and the rear wheels which prevents the placement of the conventional vibrator in the center of the truck.

The present-day standard vibrator comprises a central double-acting piston and cylinder, housed in a heavy, thick-walled steel mass. This steel mass which may weight of the order of 5,000 pounds, or more, is a reaction mass, and in operation, remains substantially at rest, permitting the vibrator to push and pull against it, to oscillate the baseplate, or pad.

Other designs of vibrators are possible, such as that shown in U.S. Pat. No. 3,789,951, issued to Daniel Silverman Feb. 5, 1974 and others, which use two or four smaller cylinders and pistons, that can be positioned on opposite sides of the drive shaft. The reaction mass can be in the form of an inverted U resting on the one or two cylinders on each side of the driveshaft. This design would not suffer the same difficulties as the system which places the vibrator on top of a tower resting on the baseplate.

Figure 6:
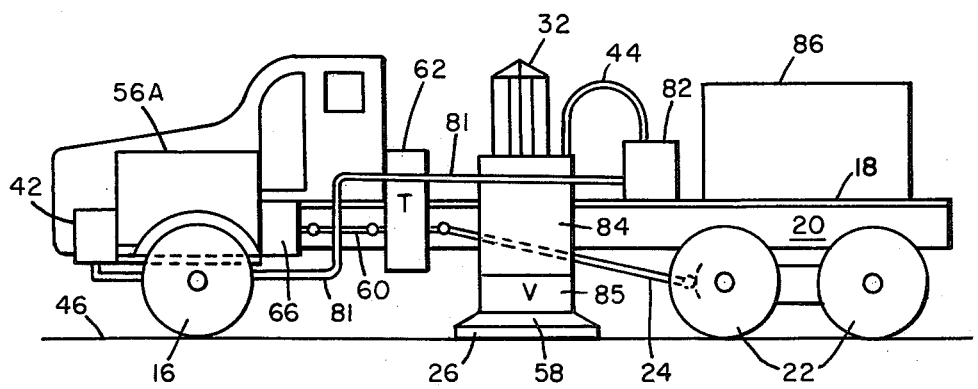
FIG. 6 is a schematic drawing of a second embodiment of this invention.

In the event such a vibrator, or a similar one, becomes available, then the design of carrier shown in FIG. 6 becomes practical.

In this embodiment the single engine 56A (shown in outline) is mounted under the hood of the vehicle. It drives a hydraulic compressor 42 that pumps pressurized hydraulic fluid by pipe or hose 81 to an accumulator 82, which provides fluid to the vibrator 85 through hose 44 in a conventional manner. The clutch 66 as shown in FIG. 4 is attached to the output of the engine. This drives a conventional gear transmission 62 through driveshaft 60. The output of the transmission drives the rear wheels through driveshaft 24 in a conventional manner. All other features are conventional or are similar to FIG. 3. The reaction mass is shown as 84, and is in the form of the inverted U shape. This configuration with the multiple pistons and cylinders positioned on both sides of the driveshaft, provides an elongated vertical opening through which the driveshaft operates. The box 86 houses auxiliary tools and equipment peripheral to the drive system.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a vehicle having only a single engine, for transport and powering of a seismic hydraulic vibrator for over the road use, comprising;
   (a) means to carry a seismic hydraulic vibrator on said vehicle, and to drive an hydraulic pump from said single engine, for pressurizing a selected first fluid for powering said vibrator, and means to control said vibrator;
   (b) gear transmission means between said single engine and the wheels of said vehicle;
   the improvement in means to repeatedly rapidly start said vehicle, for short distance travel, while said engine is running continuously at or near maximum speed; comprising;
   (c) a first wet disc clutch means connected into the drive system between said single engine and said wheels; said first wet disc clutch means capable of repeatedly starting said vehicle from rest, at or near maximum engine speed;
   whereby said single engine operating at or near maximum engine speed alternately powers the operation the said vibrator when said vehicle in at rest and powers operation of traversal of the vehicle over a series of about equal new vibration points of short distances said operations being at a constant gear ratio.

2. The vehicle as in claim 1 including oil pump means to provide pressurized oil to said wet disc clutch means, and radiator means to cool said pressurized oil.

3. The vehicle as in claim 2 including means to keep said pressurized oil flowing at all times, while said engine is running.

4. The vehicle as in claim 1 in which the number of starts of said vehicle with said first wet disc clutch means while the engine is running at or near maximum speed is at least 500 per day.

5. The vehicle as in claim 1 in which the number of starts of said vehicle with said first wet disc clutch means while said engine is running at or near maximum speed is at least 750 per day.

6. The vehicle as in claim 1, and including second wet disc clutch means connected between said wheels and the frame of said vehicle; the torque generated by said second clutch means being controllable by means of said high pressure second fluid;
   whereby said vehicle can be braked by means of said second wet disc clutch means.

7. The vehicle as in claim 1 in which said vibrator is mounted within an opening in the bed of said vehicle near the middle of the frame of said vehicle; and in which
   (a) said single engine is mounted on said bed aft of said opening;
   (b) said wet disc clutch means is attached to the output shaft of said engine facing aft;
   (c) the output shaft of said clutch means is connected by first drive shaft means to said gear transmission means, at the back end of said vehicle; and
   (d) the output shaft of said gear transmission means is connected to the back end of the rear wheels of said vehicle by means of a second drive shaft means.

8. The vehicle as in claim 1 in which;
   (a) said single engine is mounted at the front end of said vehicle;
   (b) said wet disc clutch means and said gear transmission means are mounted behind said engine;
   (c) the output shaft of said wet disc clutch means and gear transmission means is connected by a long drive shaft to the rear wheels of said vehicle.

9. The vehicle as in claim 1 and including means to control the torque transmitted by said first wet disc clutch means, at or near maximum engine speed, by means of a high pressure second fluid.

10. The vehicle as in claim 9 in which the pressure applied by said high pressure second fluid is variable with time in a selected manner.

11. The vehicle as in claim 8 in which said seismic hydraulic vibrator comprises at least two separate vibrator units, spaced apart, and attached to the baseplate, at least one on each side of said long drive shaft, and at least two vibrator units supporting at least one reaction mass.

* * * * *